Oct. 17, 1967 B. J. WARMAN ETAL 3,347,993

AUTOMATIC TELEPHONE EXCHANGE SYSTEMS WITH REGISTERING OF CALLED LINES

Filed June 15, 1964 9 Sheets-Sheet 1

Oct. 17, 1967 B. J. WARMAN ETAL 3,347,993

AUTOMATIC TELEPHONE EXCHANGE SYSTEMS WITH REGISTERING OF CALLED LINES

Filed June 15, 1964 9 Sheets-Sheet 5

Oct. 17, 1967 B. J. WARMAN ET AL 3,347,993

AUTOMATIC TELEPHONE EXCHANGE SYSTEMS WITH REGISTERING OF CALLED LINES

Filed June 15, 1964 9 Sheets-Sheet 7

Oct. 17, 1967 B. J. WARMAN ETAL 3,347,993

AUTOMATIC TELEPHONE EXCHANGE SYSTEMS WITH REGISTERING OF CALLED LINES

Filed June 15, 1964 9 Sheets-Sheet 9

United States Patent Office 3,347,993
Patented Oct. 17, 1967

3,347,993

AUTOMATIC TELEPHONE EXCHANGE SYSTEMS WITH REGISTERING OF CALLED LINES

Bloomfield James Warman and John Herbert Marshall, Charlton, London, England, assignors to Associated Electrical Industries Limited, London, England, a British company Filed June 15, 1964, Ser. No. 375,009
Claims priority, application Great Britain, July 2, 1963, 26,268/63
8 Claims. (Cl. 179—18)

ABSTRACT OF THE DISCLOSURE

An automatic telephone exchange system having normal registers for registering the identities of called lines and an additional dummy register which is rendered effective only when all of the normal registers are engaged, wherein the identity of the incoming call for which the dummy register is pressed into service is stored. The system further includes means for coupling up a busy tone to the junction of the incoming call identified within the dummy register.

This invention relates to automatic telephone exchange systems.

More specifically, the invention relates to automatic telephone exchange systems employing registers at an exchange for registering called lines' identities in response to the receipt of dial impulses over calling incoming lines connected to the exchange.

Such registers may be taken into use for calls initiated on incoming junctions connected to the exchange by arranging that free registers are seized from electronic scanning means arranged for scanning the incoming junctions in turn for the calling (e.g. looped) condition. The coupling-up of free registers to calling lines needs to be effected very rapidly in the case of incoming junction calls in order to ensure that all of the digits dialled over the calling junction for the purpose of identifying called lines' numbers are correctly received and stored within registers. An exemplary electronic scanner arrangement providing a sufficiently rapid scanning and consequent coupling of registers to calling incoming junctions is described in U.S. application No. 355,037.

Not only is very rapid coupling of registers to calling incoming junctions required, but provision should also be made for avoiding call failure due to a register becoming free and being seized by a calling incoming junction after dialling in over the junction has already commenced. This would occur as a result of all of the registers being engaged at the time when the call is initiated, as a consequence of which, by the time the register which becomes free is actually taken into use for dealing with the call, at least some of the dialled impulses for identifying the called line's number will have been lost and therefore the incorrect called line's identity will be stored in the register, resulting in call failure.

With a view to avoiding, or at least substantially reducing the chances of such call failure, the present invention provides an automatic telephone exchange system having registers as aforesaid (hereinafter referred to as normal registers) in which at least one additional register (hereinafter referred to as a dummy register) is provided for the purpose of dealing with a call initiated on an incoming junction when all of the normal registers are engaged by storing within itself the identity of the calling incoming junction for which it is taken into use and thus enabling busy tone (e.g. equipment engaged tone) to be returned to the calling incoming junction by the coupling-up of a tone circuit to the calling junction.

The dummy register, as well as the normal registers, may have the identities of calling incoming junctions passed to them from electronic scanning means which scans each of the junctions in turn for the calling condition, but the dummy register will only be in a condition for accepting and storing such an identity if all of the normal registers are engaged. For this purpose, the normal registers, which may conveniently be selected by means of an allotter (e.g. a one-only selector), may be arranged to signify their condition (i.e. busy or free) to the dummy register which identifies itself to the allotter as being free only when all of the normal registers signify to the dummy register that they are in the busy condition. This may conveniently be achieved by an electronic gating arrangement included in the dummy register in addition to arrangements for storing the identity of a calling incoming junction.

The dummy register preferably includes a timing arrangement which is started into operation when the register is initially seized and which causes the dummy register to be released after a predetermined time period. In addition, an alarm circuit may be included in the dummy register for giving an alarm if busy tone has not been returned to the calling incoming junction after an appropriate time delay. In order to signify to the dummy register that busy tone has not been returned, the particular tone circuit which is coupled-up to the calling incoming junction circuit for returning busy tone to the calling subscriber may bring about the operation of relay means in the calling junction circuit which removes the calling condition from the incoming junction circuit so that the electronic scanning means may find the incoming junction in question in the disconnected condition and signify such condition to the dummy register.

A tone circuit, which may be coupled-up to the calling incoming junction through suitable switching means set in accordance with the identity of the calling incoming junction, may conveniently be arranged to release after a predetermined time delay, if, in fact the tone circuit does not release as a result of the calling subscriber replacing his handset consequent upon the receipt of busy tone over the junction.

It is contemplated that a number of dummy registers as aforesaid may be employed in large exchanges for the purpose of causing busy tone to be returned (e.g. equipment engaged tone) to calling incoming junctions to avoid call failure.

By way of example one embodiment of the invention will now be described with reference to the accompanying drawings, in which.

Figure 1:
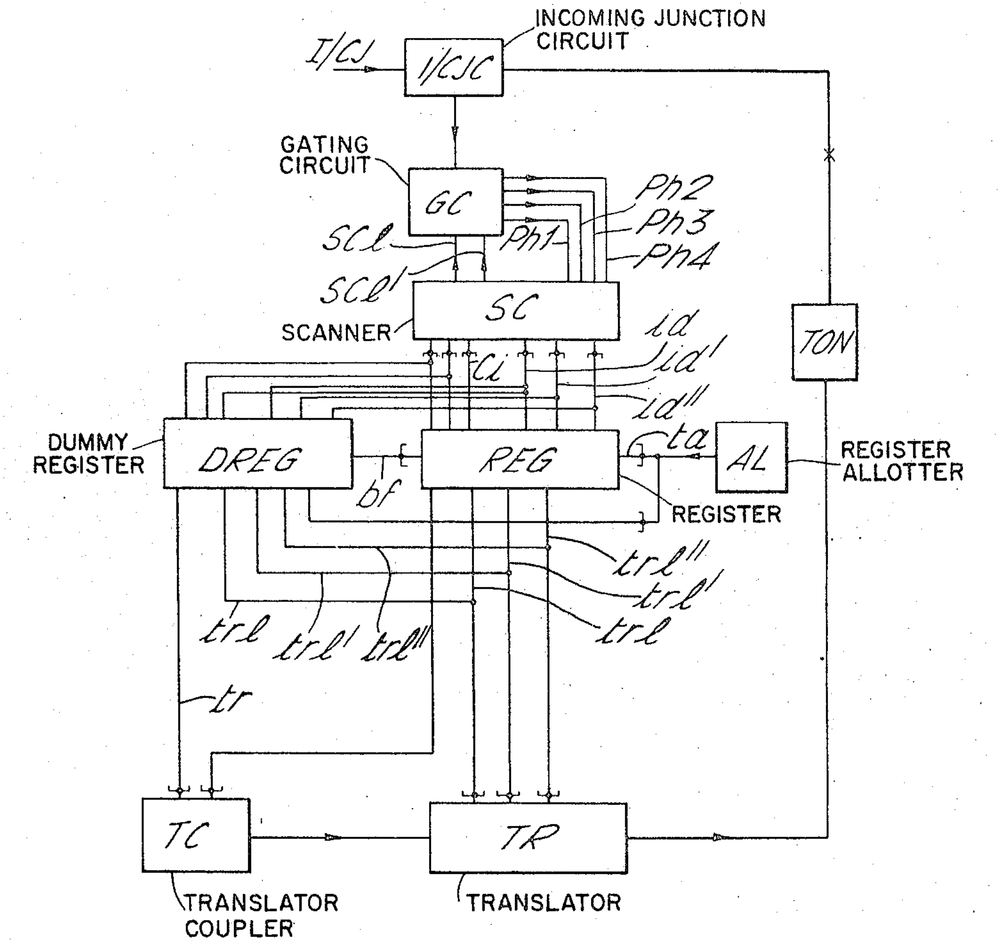
FIG. 1 is a block schematic diagram showing parts of an automatic telephone exchange system embodying, in accordance with the invention, a number of dummy registers for avoiding call failure as aforesaid.

In the present embodiment the dummy registers form part of an automatic telephone exchange system of the character described in the above-numbered co-pending application, in which incoming junctions connected to an exchange are arranged to be scanned by electronic scanning means for the purposes of detecting the initiation of calls on such junctions and of supervising dialling over calling incoming junctions by the counting and storing of dialled impulses in registers associated with the incoming junctions. The initiation of calls on incoming junctions is detected by scanning individual incoming junctions during the first parts of successive scan periods i.e. (those periods for which the electronic scanning means assumes its scan positions during the scan cycle) of the electronic scanning means, but with a view to providing the considerably higher scanning speed required for the counting and storing of dialled impulses received over calling incoming junctions the incoming junctions are arranged to be scanned in groups during the second parts of the aforesaid scan periods of the electronic scanning means. The registers serve for recording the identities of the incoming junctions for which they are taken into use as well as for registering the identities of called lines' numbers in accordance with dialled impulses received over the calling incoming junctions to which the registers are virtually coupled. Thus, routes can be set up through the exchange for the establishment of calls between subscribers in accordance with the identities of calling junctions and called lines' numbers stored within registers.

As has previously been mentioned, it is highly desirable to make provision for the return of busy tone (e.g. equipment engaged tone) over a calling incoming junction if all the registers are engaged when the call is initiated—otherwise call failure may result as a consequence of one of the registers becoming free and being seized by the calling incoming junction after dialling for identifying the called line's number has already commenced on the junction, so that the incomplete identity of the called line's number will be stored in the register. Consequently, when the identity of the called line's number is fed, together with the identity of the calling incoming junction, to translation equipment from the register in question to initiate the setting up of the call, the switching equipment for connecting the calling and called subscribers will be set improperly, resulting in call failure. It is to the avoidance of such call failure that the present invention is specifically directed and although for the purpose of describing the present invention specific reference will be made to an automatic exchange system embodying an incoming junction scanning arrangement according to the above-mentioned copending application, it should be understood that the advantages ensuing from the employment of dummy registers can be achieved with other forms of automatic telephone exchange systems wherein registers are associated with incoming junction lines connected to the exchange.

Referring now to FIG. 1 of the drawings, this shows those parts of the exchange equipment that are involved in the process of setting up incoming junction calls as far as the point where information signifying the identities of calling incoming junction and called lines' numbers are passed to translation apparatus for initiating the choice of a route through the exchange between calling and called subscribers.

Figure 2A:
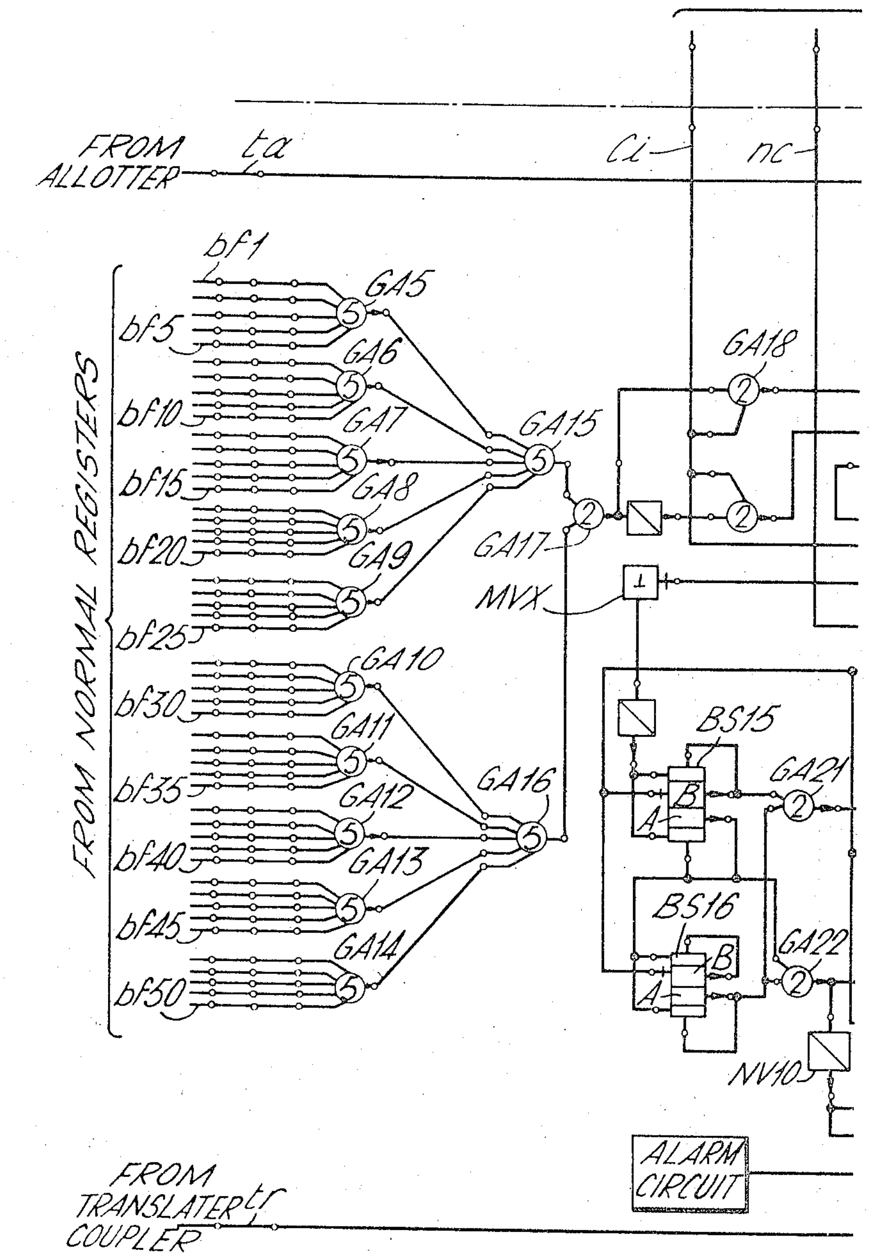
FIG. 2 is a circuit diagram of one such dummy register.
Figure 2A:
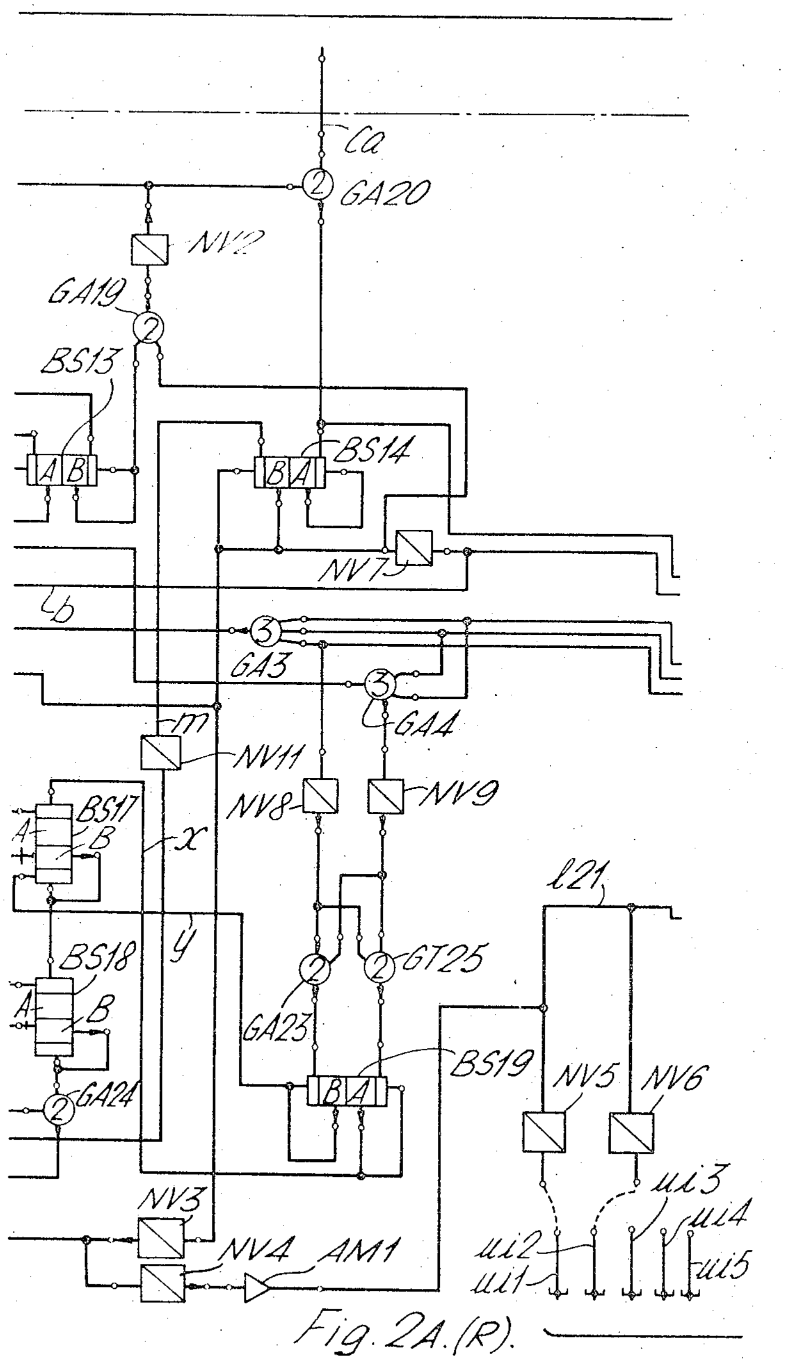
Figure 2B:
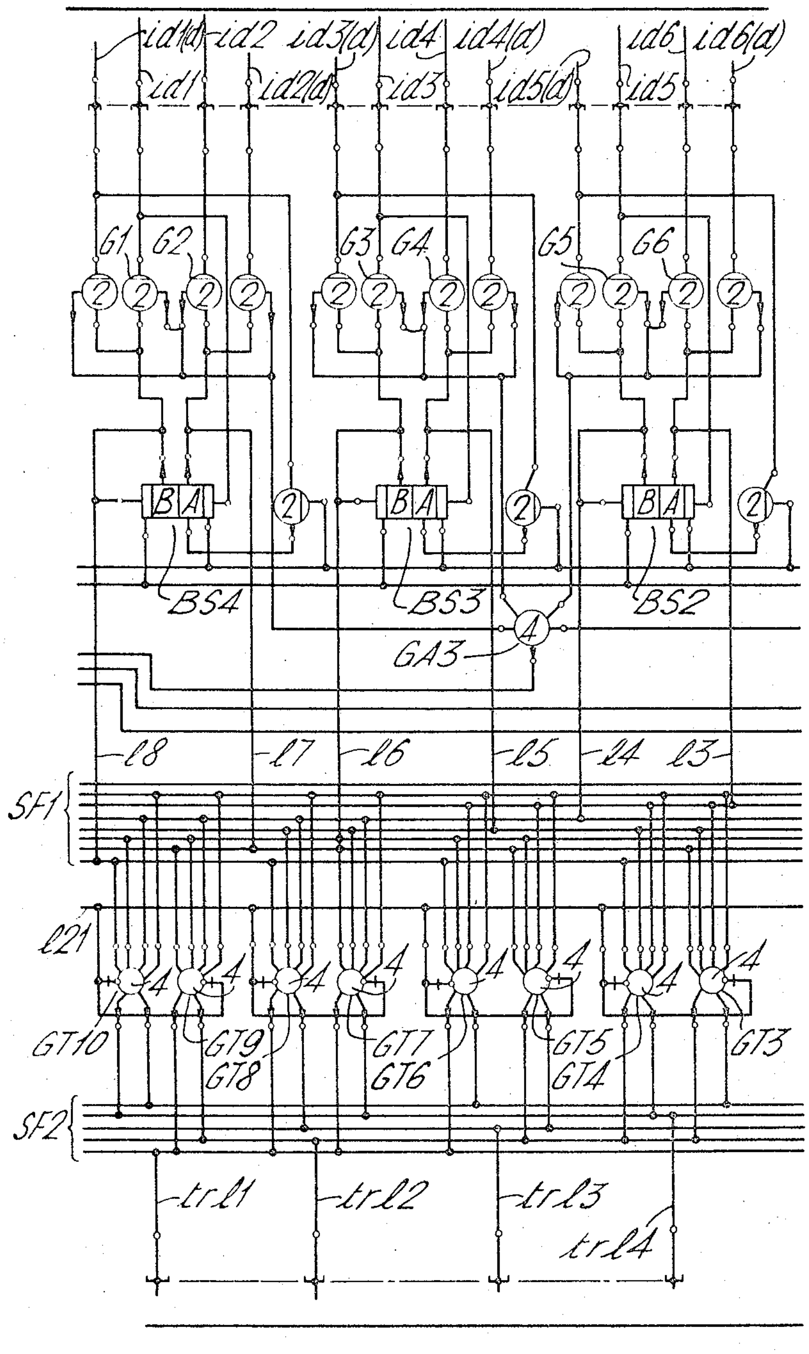
Figure 2C:
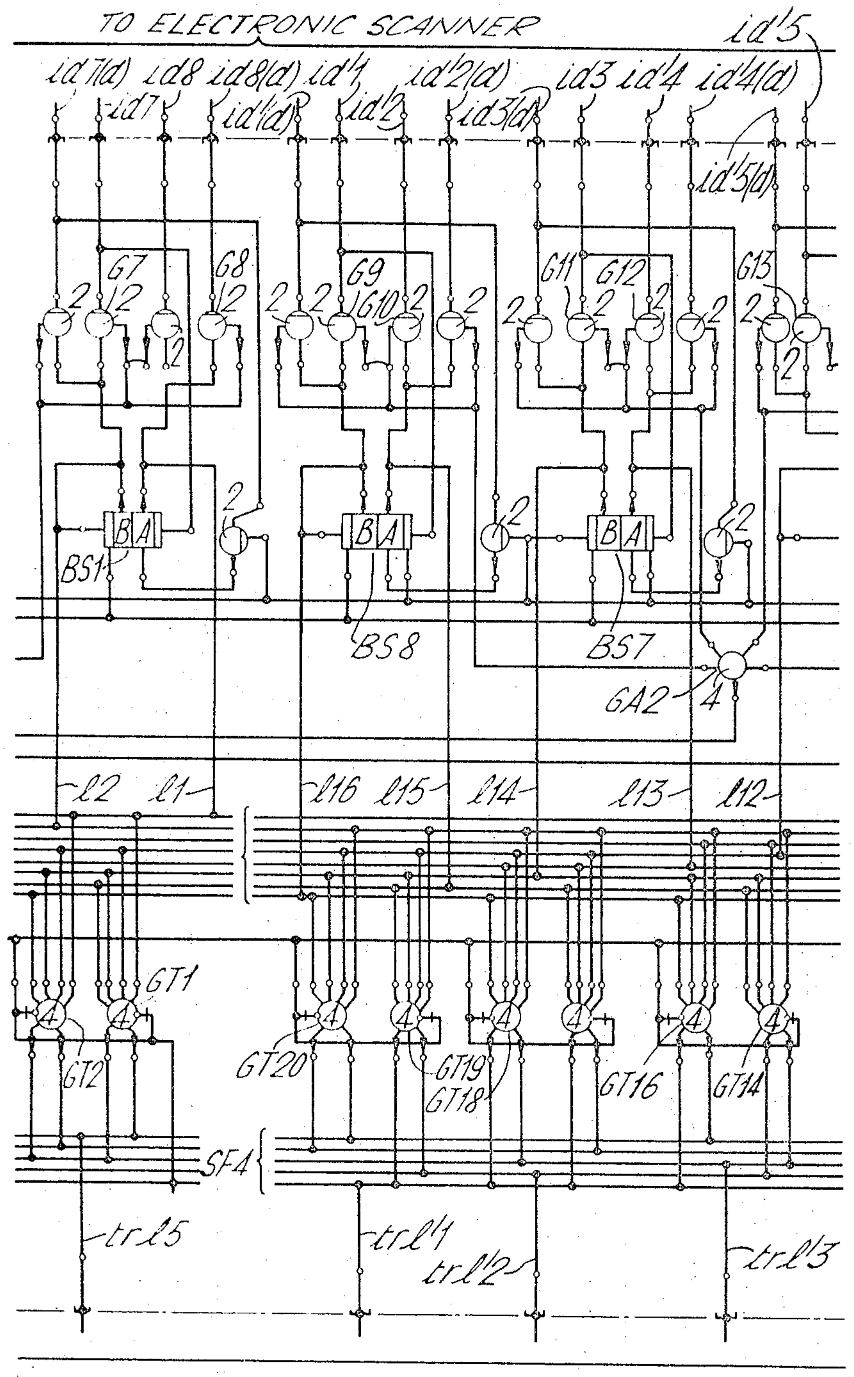
Figure 2C:
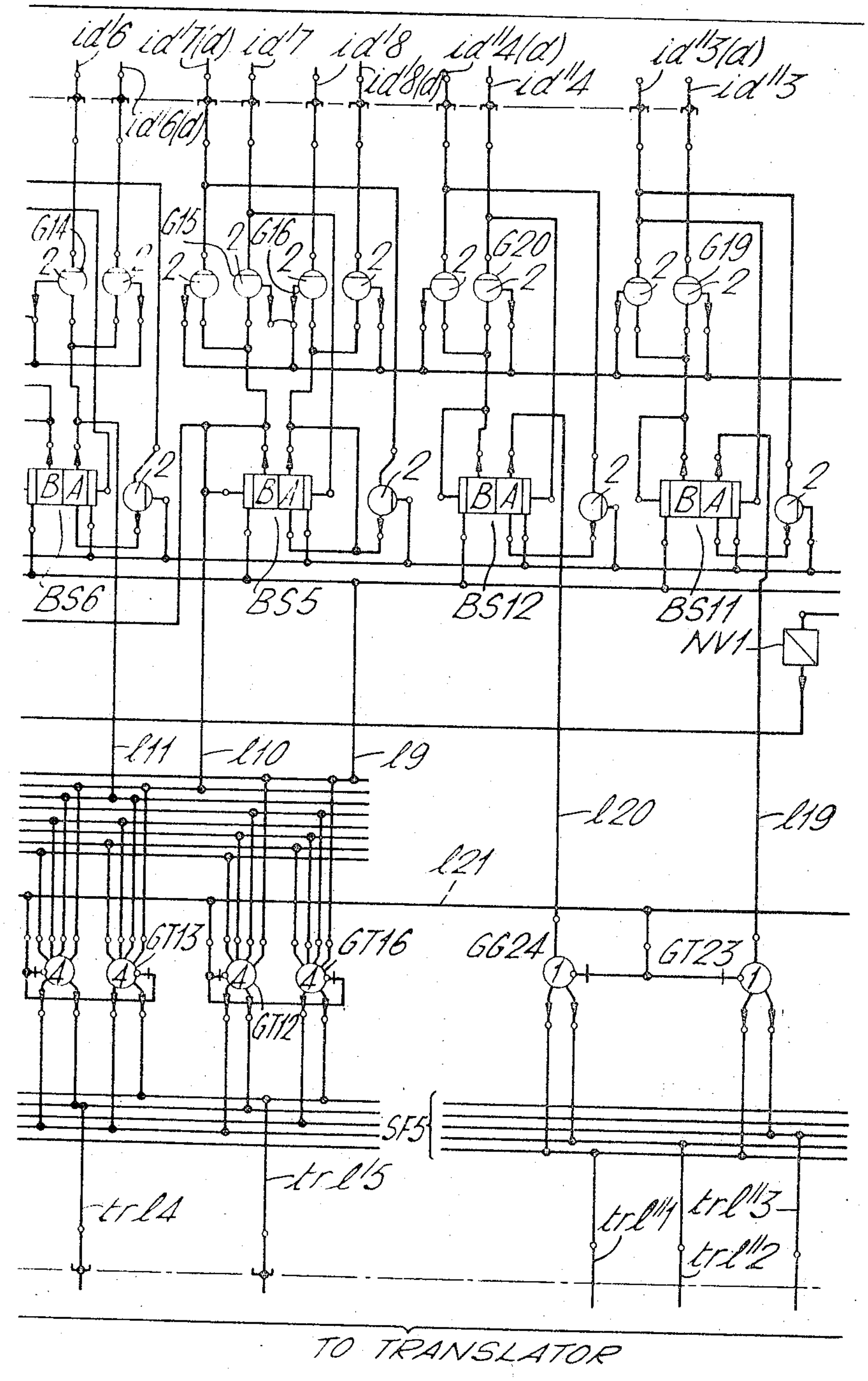
Figure 2D:
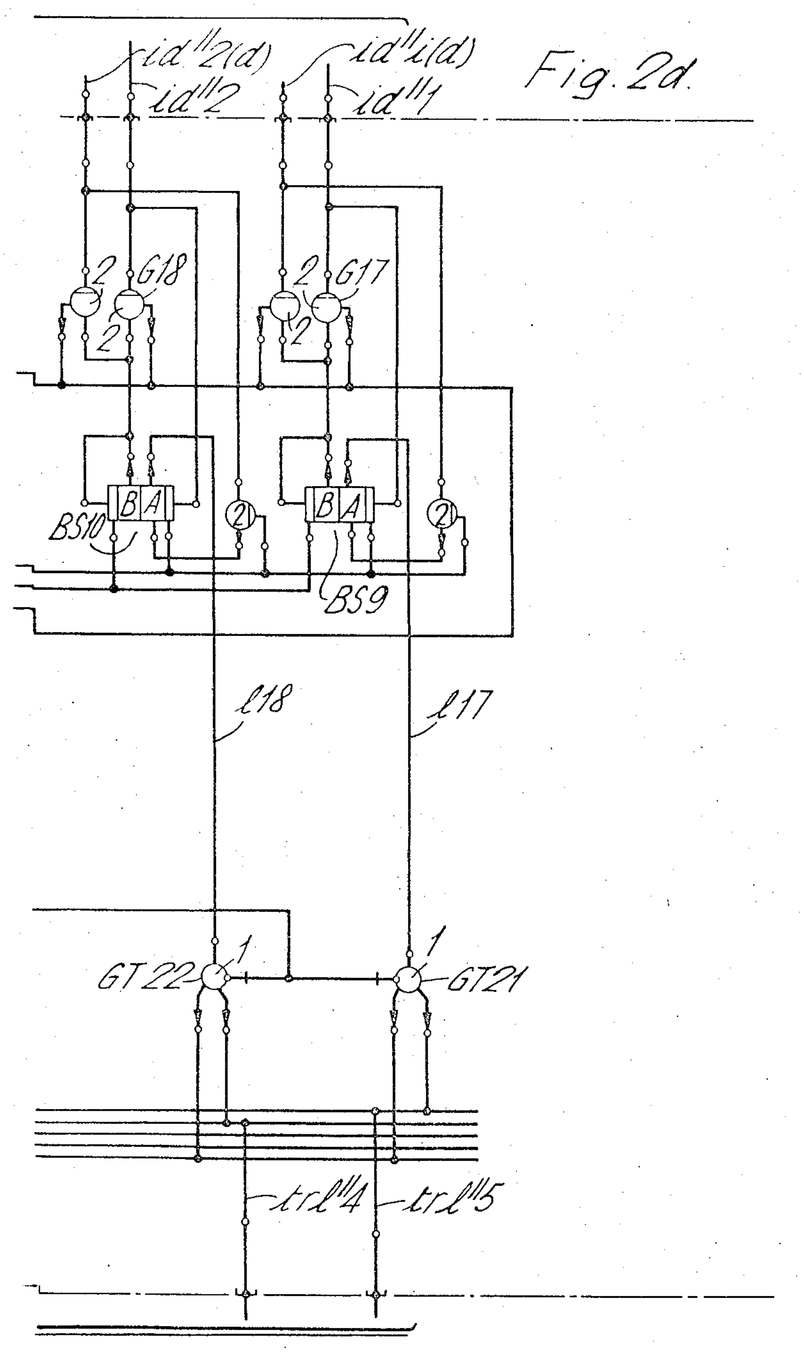

As previously mentioned, the exchange has a number of incoming junctions connected to it and one of these incoming junctions is indicated at *I/CJ* in FIG. 1. The incoming junctions are terminated on individual incoming junction circuits, as for example that shown in block form at *I/CJC*. The condition of each of the incoming junctions (e.g. looped or open-circuit condition) is signified by the incoming junction circuits to a gating circuit arrangement GC over call leads, such as the call lead *cl*, individual to the respective incoming junction circuits. More specifically, the call leads are directly connected to the bias inputs of respective pulse-plus-bias gates, hereinafter referred to as incoming junction gates, forming part of the gating circuit arrangement GC which is fully described in the above-mentioned co-pending application with reference to FIGS. 2*a* and 2*b* of the drawings. The incoming junction gates are arranged in groups, each of which is divided into sub-groups with the incoming junction gates forming each sub-group having their pulse inputs connected in common.

Figure 3:
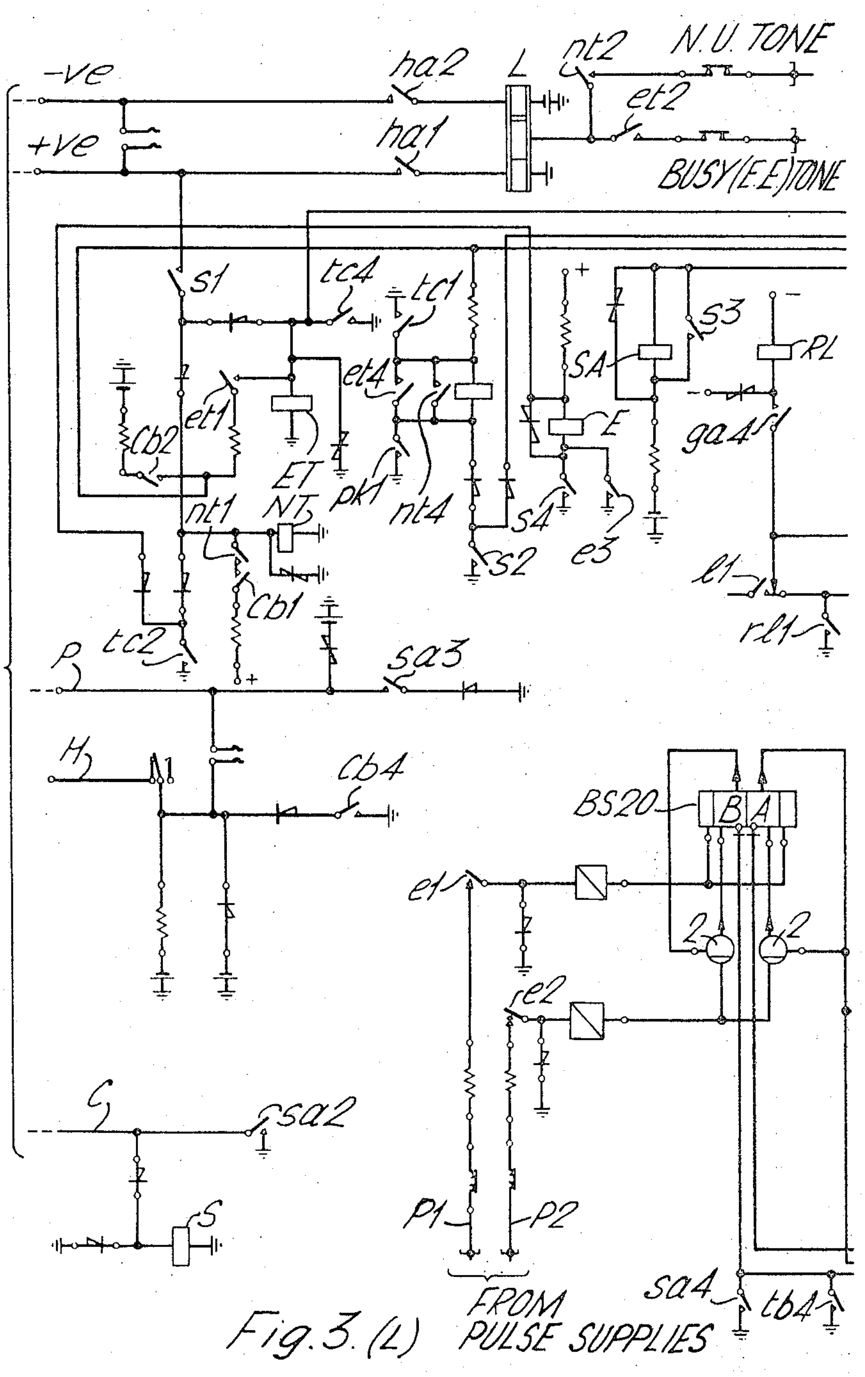
FIG. 3 is a circuit diagram of a tone circuit which serves inter alia for returning busy tone (e.g. equipment engaged tone) to calling incoming junctions.
Figure 3:
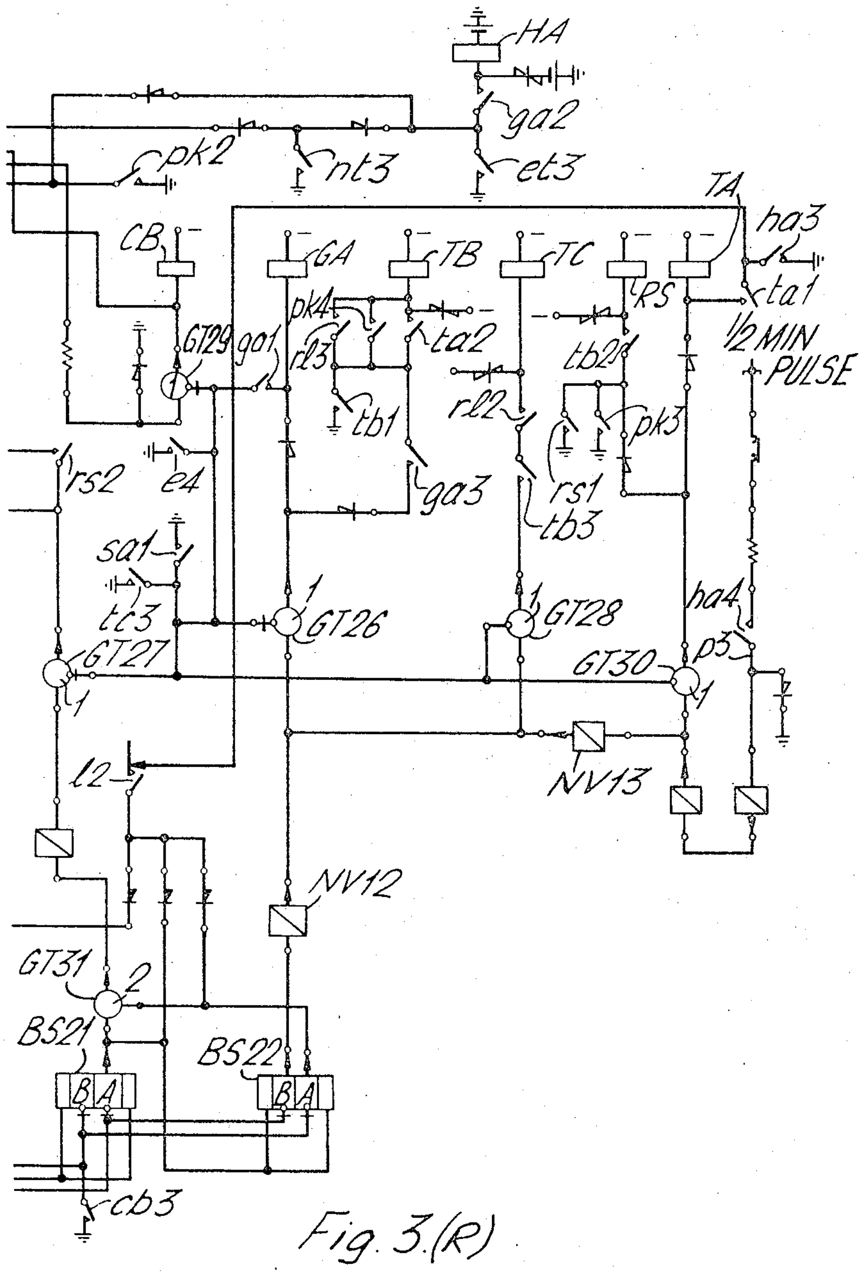

Let it be assumed for the purposes of description that the exchange has four hundred incoming junctions connected to it and that these incoming junctions are terminated on respective incoming junction circuits, such as the circuit *I/CJC*. The incoming junction gates may for instance be divided into ten groups of forty incoming junction gates each and each group may itself be divided into ten sub-groups of four gates having their pulse inputs connected in common. Pulse outputs from corresponding incoming junction gates of the sub-groups of all the groups of incoming junction gates are connected to pulse highway means serving all four hundred incoming junction gates. In the present example, the pulse highway means comprises four pulse highways designated *ph*1 to *ph*4 since each of the gate sub-groups is assumed to contain four incoming junction gates. These pulse highways extend into an electronic scanner SC for scanning the incoming junction gates (and thus the incoming junctions to which the incoming junction gates pertain) individually and in groups of four (i.e. the sub-groups of incoming junction gates). The electronic scanner SC is of the form fully described in the above-mentioned co-pending application with reference to FIGS. 3*a* and 3*b* of the drawings. It will suffice to mention here that the scanner SC comprises a composite counter having a total count of four hundred so that the counter is capable of scanning each of the incoming junctions terminated at the exchange. This counter is divided into two main parts, one of which has a total count of one hundred, while the other part of the counter has a total count of four. That part of the composite counter which has a total count of one hundred itself conveniently comprises two counters each having a total count of ten which apply one-out-of-ten markings to respective sets of ten scanner leads represented in FIG. 1 by the single leads *scl* and *scl'*. As will be apparent from FIGS. 2*a* and 2*b* of the above-mentioned copending application, the two sets of leads are connected up to gating circuits within the circuit GC which serve for combining the one-out-of-ten markings to mark one out of a set of one hundred leads extending, respectively, to the sub-groups of four incoming junction gates and connected with the commoned pulse inputs of the appertaining sub-grouped gates. The markings extended over the sets of scanner leads *scl* and *scl'* serve to bring about the scanning of a different sub-group of four incoming junction gates for each count position of the composite scanner counter. In addition, the scanner counter having a total count of four serves for scanning one of the incoming junction gates of the sub-group being scanned by the other counter by scanning that highway of the pulse highways *ph*1 to *ph*4 which is connected to the pulse output of the incoming junction gate concerned. It will thus be appreciated that the condition of a particular incoming junction gate (i.e. open or closed) signifying the looped or open-circuited condition of its appertaining incoming junction can be ascertained by the combined scanning action of both parts of the composite scanner counter, whereas the conditions of all four of the incoming junction gates of the same sub-group can be ascertained by rendering that part of the composite counter having a total count of four ineffective by nullifying its selecting action.

It has already been mentioned that a number of registers are associated with the incoming junctions and may be taken into use for storing the identities of calling incoming junction and called lines' numbers. The composite counter of the electronic scanner SC is arranged for extending to such registers, such as the register REG in FIG. 1, over sets of leads represented by the leads *id, id'* and *id''*, markings corresponding to the identity of a particular calling incoming junction gate and thus the identity of the appertaining incoming junction.

The duration of the scan period of the composite scanner counter (i.e. that period for which the composite counter is located in a particular count position) is controlled by timing elements in the scanner which are fully described with reference to FIG. 3*a* in the above-mentioned co-pending application. In accordance with the invention forming the basis of the said co-pending application, each scan period of the scanner SC is divided into two successive parts. During the first part of each scan period, the composite scanner counter is effective for scanning an individual incoming junction. This is for the purpose of detecting the initiation of a call on that junction, whereas during the second part of the scan period the scanner counter having a total count of four is rendered ineffective as aforesaid in order to provide simultaneous scanning of the four incoming junctions pertaining to the sub-group of four incoming junction gates for the purpose of supervising dialling on any of the four incoming junctions. The reason for this method of scanning is that the supervision of dialling on calling incoming junctions necessitates a considerably higher junction scanning rate than the detection of new calls on incoming junctions. In this connection, to ensure the detection of all dial impulses received over a calling incoming junction, it is necessary to scan the calling incoming junctions every seven milliseconds or less. For example, the composite scanner counter may be arranged to be driven from a multivibrator providing a twenty kc./s. signal. Since the composite scanner counter has a total count of four hundred, it will complete its count cycle every twenty milliseconds. The two scanner counters, providing between them a count of one hundred for scanning a sub-group of four incoming junction gates, are arranged to step the counter having a total count of four each time they complete a count cycle. Thus, a count cycle of the hundred counter is completed every five milliseconds. Accordingly, the incoming junctions are scanned for new calls every twenty milliseconds and are scanned for the supervision of dialling every five milliseconds. Each scan period will accordingly have a duration of fifty microseconds.

During the first part of each scan period of the electronic scanner SC, the latter identifies to all of the registers, such as the register REG, the particular incoming junction being scanned if the junction is in the looped condition. The identification is made over the sets of leads *id*, *id'* and *id''* by the opening of gates in the scanner SC under control of the timing and sequencing elements described with reference to FIG. 3*a* in the above-mentioned co-pending application. Comparator elements, which will hereinafter be described, serve for comparing the calling incoming junction identity passed to the registers with the identity of any calling incoming junction already stored in junction identity stores of the registers. If the comparator elements in any of the registers, such as the register REG, find correspondence between the junction identities in question, an inhibit signal will be applied by the register to a new call ask lead *nc* to prevent seizure of a further register. In this connection, it may be mentioned that, for the seizure of a free register in respect of a new call, such correspondence must not be found by the comparator elements of any register and, consequently, there will be no inhibit signal present on the new call ask lead *nc*. A free register, which will already have been selected by a register allotter AL comprising a one-only selector, when the conditions just above described obtain, is seized from the scanner SC by a seize signal passed to it over a new call answer lead *ca*, whereupon the register will be marked busy to the allotter AL and the incoming junction identity stores within the register will be opened to enable the stores to be set in accordance with the identity of the calling incoming junction for which the register has been taken into use.

For the second part of the scan period, the effective count position of the scanner counter having a total count of one hundred is identified to the registers in common over sets of leads *id* and *id'* and thus identifies a particular sub-group of four incoming junction gates or incoming junctions. These four junctions are scanned simultaneously for detecting dial impulses and for this purpose four gates connected in the respective pulse highways are arranged to be primed by a signal derived from the scanner timing and sequencing elements referred to above so that pulse outputs will be extended to the registers over one or more of the leads *id''* if the incoming junctions appertaining to the sub-group of incoming junction gates, to which the pulse highways *ph*1 to *ph*4 are connected, are in the looped condition. Since registers will have already been taken into use for calling junctions on which dialling is to be supervised, only the engaged registers will respond to correspondence found by the comparator elements of the registers between the identities of the calling incoming junctions extended to the registers over the sets of leads *id*, *id'* and *id''* and the identities of the calling incoming junctions already stored within the registers. Thus, in the present embodiment, a maximum of four registers can respond at the same time to supervise dialling as a result of correspondence found between the stored incoming junction identities and those identities extended to the registers from the electronic scanner SC. Each time a sub-group of incoming junction gates is scanned during successive scanning cycles of the scanner SC, a pulse will be applied to an appropriate one of the pulse highways *ph*1 to *ph*4 to open the primed gate in this highway and thereby produce a marking on one of the set of leads *id''* if there is a dial loop impulse on the appertaining calling incoming junction at the instant of scanning. The marking accordingly applied to one of the set of leads *id''* will elicit a response from the register taken into use for dealing with the call on the incoming junction in question. Such response of a register enables the register, during successive scanning cycles, to count and store within itself the dial impulses received over the calling incoming junction for the purpose of identifying the called line's number. After at least some of the dialled digits have been received and stored in the register, a translator TR common to all the registers REG may be coupled up to the register in question under control of a translator coupler TC controlled from the register for passing to the translator the identification of the calling incoming junction and the called line's number, which it can translate for the purpose of routing the call through the exchange.

In order to ensure that the counting of dial impulses received over a calling incoming junction by a register is not affected as a result of response of the register due to the aforesaid correspondence being found between junction identities during the first parts of scan periods in successive scanning cycles of the scanner SC, an inhibit signal is present on a count inhibit lead *ci* extending from the scanner to the register, such as the register REG, during the first part of each scan period to render any response of the register ineffective to operate the dial impulse counting arrangement, but the inhibit signal is removed during the second part of each scan period under the control of the timing and sequencing elements of the scanner SC.

In accordance with this invention dummy registers, such as the dummy register DREG, are provided which are connected with the electronic scanner SC and which are busied to the register allotter AL until all the normal registers, such as the register REG, have been taken into use. The purpose of these dummy registers is to register the identity of a calling incoming junction in the event of all registers, such as the register REG, being engaged so that busy tone (i.e., equipment engaged tone) can be returned over the calling incoming junction and also the loop condition extended to the gating circuit GC over the appropriate call lead *cl* may be removed at the incoming junction circuit on which the calling junction is terminated. In this way, call failure after dialling into the exchange over an incoming junction can be avoided.

It is contemplated that in the interests of security and for dealing with heavy traffic conditions at least two and possibly three dummy registers will be provided.

For the purpose of feeding busy tone to a calling incoming junction, tone circuits, such as the tone circuit TON, are provided. A tone circuit, as will be described later with reference to FIG. 3 of the drawings, will be taken into use in response to information fed to the translator TR from the dummy register consequent upon the coupling up of the translator to the dummy register under the control of the translator coupler TC and busy tone will be fed via switching equipment to the calling incoming junction whose identity was passed to the translator TR from the dummy register.

Reference will now be made to FIG. 2 of the drawings, which shows a circuit diagram of one of the dummy registers, such as the dummy register DREG in FIG. 1. As previously mentioned, each of the dummy registers is required to record the identity of a calling incoming junction for which the dummy register is taken into use and to pass information to the translator TR (FIG. 1) for initiating the return of busy tone (i.e. equipment engaged tone) to the calling incoming junction in question. For the purpose of recording the identity of such calling incoming junction the dummy register comprises stores defined by three groups of transistor bistable circuits. The first of these groups of bistable circuits consists of four circuits BS1 to BS4 which correspond, respectively, to four transistor bistable circuits forming one of the tens' counters of the composite counter of the scanner SC (FIG. 1). A second group of four bistable circuits BS5 to BS8 corresponding to four bistable circuits constituting the other tens' counter of the scanner SC. Yet another group of four transistor bistable circuits BS9 to BS12 pertain, respectively, to the pulse highways *ph*1 to *ph*4. From FIG. 1, it will be seen that the groups of leads *id, id'* and *id''* extend into the dummy register DREG as well as extending into the register REG. The new call ask lead *nc*, the new call answer lead *ca* and the count inhibit lead *ci* also extend into the dummy register DREG. Reverting to FIG. 2, it will be observed that leads *id*1 to *id*8 (i.e. group *id* of FIG. 1) are connected to the pulse inputs of respective pulse-plus-bias gates G1 to G8 having their bias inputs connected to the outputs from the A and B sections of the bistable circuits BS1 to BS4. Leads *id'*1 to *id'*8 (i.e. group *id'* in FIG. 1) are connected to the pulse inputs of pulse-plus-bias gates G9 to G16 which have their bias inputs connected to the outputs from the A and B sections of the bistable circuits BS5 to BS8. In addition, leads *id''*1 to *id''*4 (i.e. group *id''* in FIG. 1) are connected to the pulse inputs of pulse-plus-bias gates G17 to G20. The bias inputs of the gates G17 to G20 are connected to outputs from the B sections only of the bistable circuits BS9 to BS12.

The pulse-plus-bias gates G1 to G16 are associated, respectively, with corresponding sections (i.e. A or B section) of corresponding bistable circuits in the dummy register stores and the scanner tens' counters (i.e. counters CC and BC in FIGS. 3*a* and 3*b* of the drawings relating to the above-mentioned co-pending application. These pulse-plus-bias gates serve as comparator elements for comparing the identity of a particular sub-group of incoming junction gates (or group of incoming junctions) passed to the registers, such as the register REG, as well as to the dummy registers, such as the register DREG in FIG. 1, from the scanner SC over the sets of leads *id*1 to *id*8 and *id'*1 to *id'*8, with any incoming junction sub-group identity already stored within the dummy register. The normal registers, such as the register REG, which are of the form described fully with reference to FIG. 4 of the drawings accompanying the above-mentioned application also comprise comparator elements which compare incoming identities of groups of incoming junctions with any group identities already stored within the registers.

The principle of operation of the pulse-plus-bias gates constituting comparator elements is fully described in U.S. application No. 353,861. It will suffice to mention, however, that if the conditions of the bistable circuits of the dummy register store defined by the bistable circuits BS1 to BS4 correspond with those of the appertaining bistable circuits of the appropriate tens' counter of the scanner SC, then one or other of each pair of pulse-plus-bias gates, such as the pair of gates G1 and G2 will provide a positive output pulse. Positive output pulses from the paired gates are applied to pulse inputs of an "AND" gate GA1 to provide an output from this gate. If, however, there is lack of correspondence between the conditions of corresponding bistable circuits, then neither of the gates of one or more pairs of gates, such as the pair of gates G1 and G2, will open to provide a pulse which opens or prepares for opening the gate GA1. As regards gates G9 to G16, these have likewise associated with them an "AND" gate GA2 which opens to provide an output only when the conditions of the bistable circuits of the other tens' counter of the scanner SC are the same as those of the corresponding bistable circuits in the register store comprising bistable circuits BS5 to BS8.

In the case of the other dummy register store comprising bistable circuits BS9 to BS12, the gates G17 to G20 compare a marking on the leads *id''*1 to *id''*4 with the conditions of the bistable circuits. If there is predetermined correspondence, then one of the gates G17 to G20 will provide an output which, after inversion by an inverter NV1, is applied, together with the outputs from the "AND" gates GA1 and GA2 (assuming complete conformity between marked and stored incoming junction identities), to the respective inputs of a further "AND" gate GA3 having its output connected to the new call ask lead *nc*. The outputs from the gates GA1 and GA2 are also fed to respective inputs of a further "AND" gate GA4 having another input which is connected to the count inhibit lead *ci* connected to the scanner SC. It may be mentioned at this point that the lead *ci* and the other leads *nc* and *ca* are duplicated in practice and extend, together with the leads *id, id'* and *id''* having the suffix *d*, to another electronic scanner identical to the scanner SC (FIG. 1). The other scanner will be arranged to be brought into service alternately with the scanner SC (FIG. 1) by suitable change-over switching means.

It has previously been mentioned that the dummy registers are arranged to be taken into use for a calling incoming junction only when all of the normal registers, such as the register REG, are engaged. To this end, the dummy registers will be marked busy to the allotter AL (FIG. 1) over the test/allot lead *ta* until such time as all of the registers REG signify to the dummy registers that they have been taken into use in respect of calling incoming junctions. This is achieved by transmitting busy/free signals to the dummy register DREG from the normal registers, such as the register REG, over busy-free leads designated *bf*1 to *bf*50. These busy/free leads, such as the lead *bf*1, may be connected to the output from one of the sections of a busy/free bistable circuit which is arranged to turn over to apply a register busy potential to the lead *bf*1 when the register is seized since each of the busy/free leads *bf*1 to *bf*50 is connected to an individual register. It is assumed that the exchange in the present embodiment will be equipped with fifty normal registers, such as the register REG. As will be appreciated from a consideration of FIG. 4 of the drawings accompanying the first-mentioned co-pending Application, the registers when seized cause negative outputs to be applied to the appertaining leads of the group of busy/free leads *bf*1 to *bf*50. The busy/free leads *bf*1 to *bf*50 are divided into ten sub-groups of five leads each, such as the sub-group *bf*1 to *bf*5, and these sub-groups are, respectively, connected to the inputs of ten "AND" gates GA5 to GA14. The outputs from the gates GA5 to GA9 are connected to the inputs of an "AND" gate GA15, while the outputs from the gates GA10 to GA14 are connected to the inputs of an "AND" gate GA16. The outputs from the two gates GA15 and GA16 are taken to the inputs of a further "AND" gate GA17. The arrangement of the associated gates GA5 to GA17 is such that the gate GA17 is opened only when negative potential is applied to all of the normal register busy/free leads *bf1* to *bf50*, that is to say when all the normal registers are engaged. An "AND" gate GA18 is primed by the output from the opened gate GA17 so that the gate GA18 will be opened by an appropriate output applied to the inhibit lead *ci* from a monostable transistor circuit (not shown) in the electronic scanner SC. When the gate GA18 opens, a positive pulse output is applied to the pulse input of the bias opened pulse-plus-bias gate of the A section of a transistor bistable circuit BS13. Since the transistor in the A section of the circuit will be normally conducting, as is the case with the A sections of all the bistable circuits, the bistable circuit is operated so that the B secion transistor is rendered conducting to provide a positive output from its collector which biases open the pulse-plus-bias gate of the B section. The negative output from the A section transistor opens an "AND" gate GA19 which derives its other negative input from the B section of a busy/free bistable circuit BS14. The gate GA19, in opening, causes a negative potential to be applied to the test/allot lead *ta* from in niverter NV2, thereby enabling the allotter to select the dummy register DREG for handling an incoming call.

If a new call is initiated on a particular incoming junction which is being scanned as aforesaid by the scanner SC during the first part of a scan period and all of the normal registers are busy, then the dummy register DREG will be applying negative potential to the new call ask lead *nc* since the gate GA3 is closed because the identity of the incoming junction on which the new call is initiated is not already stored in any of the registers. Consequently, the dummy register will be seized from the scanner SC by the application of a negative seize potential to the call answer lead *ca* during the first part of the scan period in the manner fully described in the first-mentioned co-pending Application with reference to FIGS. 3 and 4. The negative potential applied to the call answer lead *ca*, in conjunction with the negative potential applied to the test/allot lead *ta* from the inverter NV2, opens an "AND" gate GA20. The positive pulse output from this gate is applied to the biased open pulse-plus-bias gate of the A section of the busy/free bistable circuit BS14, with the result that the latter circuit operates. The consequential positive output from the B section of the circuit is applied to one of the inputs of the gate GA19 to close this gate and thereby cause the negative potential to be removed from the test/allot lead *ta* so that the dummy register is busied to the allotter. The positive pulse output from the gate GA20 which operates the busy/free bistable circuit BS14 to its busy state is also applied to the commoned pulse inputs of the A sections of all the bistable circuits BS1 to BS12 constituting the calling incoming junction identity stores in order to set these bistable circuits in accordance with the conditions of the scanner counters (i.e. counters CC, BC and AC in FIG. 3 of the first-mentioned co-pending Application). When these bistable circuits have been set, the gate GA3 will be operated and positive potential will be applied to the new call ask lead *nc* to prevent the seizure of a further dummy register, or a normal register if one becomes free, during a subsequent scan period.

The positive output from the B section of the busy/free bistable circuit BS14 is also applied through an inverter NV3 to a translator coupler TC (FIG. 1) over a lead *tr* to indicate to the coupler that the translator TR (FIG. 1) is required to be coupled to the dummy register DREG to receive over leads *trl1* to *trl5*, *trl'1* to *trl'5* and *trl''1* to *trl''5* the identity of the calling incoming junction for which the dummy register has been taken into use. The translator TR will then provide a translation of the identity received from the dummy register to enable the calling incoming junction to be located for the return of busy tone over the calling incoming junction from a tone circuit TON (FIG. 1) to be described later with reference to FIG. 3 of the accompanying drawings. The negative output from the inverter NV3 is also applied to the input of an inverter NV4 and the resulting positive output, after amplification by an amplifier AM1, is applied to inverters NV5 and NV6 as well as to the emitter connections of emitter inhibit "AND" gates GT1 to GT24 in order to bring about the gating out of markings from the dummy register DREG to the translator TR for the purpose of identifying the calling incoming junction.

The translator TR in the present embodiment requires the information identifying the calling incoming junction to be in the form of three two-out-of-five markings. In order to furnish these markings, the outputs from the respective sections of bistable circuits BS1 to BS4 are connected over leads *l1* to *l8* to a strapping field SF1 having the ten emitter inhibit "AND" gates GT1 to GT10 associated with it. The strapping field SF1 and associated gates GT1 to GT10 serve for converting the binary marking emanating from the group of bistable circuits BS1 to BS4 to a one-out-of-ten marking and in order to convert this marking into a two-out-of-five marking the outputs of the gates GT1 to GT10 are connected with the wires of a strapping field SF2 having the five leads *trl1* to *trl5* associated with it. This provides the first of the three two-out-of-five markings required by the translator TR.

The binary marking applied to leads *l9* to *l16* from the bistable circuits BS5 to BS8 is applied to a strapping field SF3 having the gates GT11 to GT20 associated with it. In this way, the binary marking is converted to a one-out-of-ten marking which is then converted into a two-out-of-five marking on the leads *trl'1* to *trl'5* by connecting the outputs of the gates GT11 to GT20 to particular wires of a strapping field SF4. This provides the second of the three two-out-of-five markings for the translator. The third two-out-of-five marking is derived from the one-out-of-four marking provided by the bistable circuits BS9 to BS12. This one-out-of-four marking is applied to leads *l17* to *l20* and for the purpose of converting this marking to a two-out-of-five marking the leads *l17* to *l20* are connected to the inputs of the four gates GT21 to GT24 each having two outputs connected to respective wires of a strapping field SF5 which has the group of five leads *trl''1* to *trl''5* connected to strapping field wires. Thus, it will be seen that three two-out-of-five markings can be extended to the translator TR over the leads *trl1* to *trl5*, *trl'1* to *trl'5* and *trl''1* to *trl''5*. Such extension of markings can only take place if earth potential is applied to the commoned emitters of the transistors of the gates GT1 to GT24 over a lead *l21*. Such earth potential is arranged to be applied to the lead *l21* from the lead *tr* when it is required to transmit the calling junction identity markings to the translator TR from the dummy register DREG.

The exchange in the present embodiment may have its switching equipment sectionalised in accordance with the principles set forth in U.S. application No. 122,137. As is fully described in the latter application economies in exchange switching equipment can be achieved by dividing the exchange equipment into sections and still further economies in switching equipment can be realised by dividing each of the exchange sections into a number of units. Each of the exchange sections may conveniently be divided into five units and each of the five units deals with a proportion of the total number of lines connected to the exchange. These lines include the incoming junctions connected to the exchange and for the purpose of identifying to the translator TR the particular unit of an exchange section in which the incoming junctions are connected a unit identity marking is arranged to be applied to the translator over unit identity leads *ui*1 to *ui*5. This marking, which is a two-out-of-five marking like the junction identity markings arranged to be extended to the translators TR over the leads *trl*1 to *trl*5, *trl'*1 to *trl'*5 and *trl''*1 to *trl''*5, is derived from the inventors NV5 and NV6 which have their outputs strapped to two of the unit identity leads *ui*1 to *ui*5 and apply negative outputs to these leads when an earth signal is applied to the lead *l*21 to open the gates GT1 to GT24.

When the dummy register DREG is seized by an incoming call by negative potential applied to the call answer lead *ca* from the electronic scanner SC, the busy/free bistable circuit BS14 turns over in response to the positive pulse applied to the pulse input of the pulse-plus-bias gate associated with the A section of the circuit through the open gate GA20. As the bistable circuit BS14 turns over, a positive output is applied to an inverter NV7 which provides a negative output which is fed over a lead *b* to a multivibrator MVX with emitter connection to start the multivibrator into operation. The positive pulse output from the "AND" gate GA20, as well as being applied to the busy/free bistable circuit BS14, is applied to the commoned pulse inputs of the pulse-plus-bias gates associated with the A sections of the bistable circuits BS1 to BS12 to set these bistable circuits in accordance with the markings extended to the dummy register over leads *id*1 to *id*8, *id'*1 to *id'*8 and *id''*1 to *id'*4. The bistable circuits BS1 to BS12 accordingly register the identity of the calling incoming junction for which the dummy register is taken into use.

As mentioned above, the turning over of the busy/free bistable circuit BS14 causes the multivibrator MVX to be started into operation which drives a timing arrangement for the re-setting of the dummy register following the transmission of the calling incoming junction identity stored within the register, as well as the unit identity, to the translator TR for the initiation of the transmission of busy tone back over the calling junction. This timing arrangement comprises four transistor bistable circuits BS15 to BS18, the A sections of which are normally conducting. A lead *a* extends to the emitters of the B sections of all of the bistable circuits BS15 to BS18. This lead *a* is normally at negative potential, but the latter is replaced by earth potential when the dummy register is seized, in order to prime the transistors of the B sections of the bistable circuits BS15 to BS18. However, when earth potential is applied to the *a* lead, the conditions of the bistable circuits BS15 to BS18 remain unchanged. Consequent upon the starting up of the multivibrator MVX, a positive pulse output is derived from an inverter and is applied to the pulse inputs of pulse-plus-bias gates associated, respectively, with the A and B sections of the bistable circuit BS15 to cause this bistable circuit to turn over, since the gate associated with the A section is open by virtue of positive potential applied to its bias input from the output of the A section. This bistable circuit BS15, together with the bistable circuit BS16, comprise a two-stage counter with the latter circuit being driven from the former. Two "AND" gates GA21 ("NOR" gating) and GA22 are associated, as illustrated, with the counter so that they are opened and closed in accordance with the conditions of the bistable circuits BS15 and BS16. Initially, both of the gates GA21 and GA22 are closed since positive and negative potentials are applied to the inputs of gate GA21 and positive inputs are applied to the gate GA22. In the closed condition, the output from the gate GA21 is earth potential, while the output from the gate GA22 is negative potential. The operation of these gates is such that when the B section transistor of the bistable circuit BS15 is conducting while the A section transistor of the bistable circuit BS16 is conducting, the gate GA21 will be opened for producing a negative pulse, conveniently referred to as an S pulse. On the other hand, when the transistors of the B sections of both bistable circuits BS15 and BS16 are conducting, the gate GA22 will be opened for producing a positive pulse, conveniently referred to as a K pulse. The outputs from the gates GA21 and GA22 are connected, respectively, to the pulse inputs of the pulse-plus-bias gates associated, respectively, with the A sections of the bistable circuits BS17 and BS18. Bias and pulse inputs to the pulse-plus-bias gates of the bistable circuit BS17 are derived from the outputs from a bistable circuit BS19, which corresponds to the bistable circuit BS25 in FIG. 4*a* and FIG. 5 of the drawings accompanying the first-mentioned co-pending application, and operates in like fashion to circuit BS25 by appropriate operation of the gates GT25 and GA23 and the gates GA3 and GA4, which gates correspond, respectively, to the gates GT2, GA79, GA59 and GA60 (FIGS. 4*a* and 5) in said co-pending application. It may be mentioned here, however, that the bistable circuit BS19 is arranged to be turned over so that the transistor of the B section of the circuit is conducting when the calling incoming junction is initially found to be in a looped condition by the electronic scanner and will revert to the other condition (i.e. normal condition) only if the incoming junction is subsequently found to be disconnected. Consequently, if the incoming junction is found looped, earth potential will be applied to the lead *y* extending to the pulse input of the pulse-plus-bias gate associated with the B section of the bistable circuit BS17. At the same time, a negative potential is applied to a lead *x* extending to the bias input of the pulse-plus-bias gate associated with the A section of the bistable circuit BS17.

The multivibrator MVX produces a driving pulse every 200 milliseconds (i.e. 5 c./s.) and consequently when the gate GA21 opens, consequent upon bistable circuit BS15 turning over to the first output pulse from MVX, the S pulse persists for 200 milliseconds. During this time, the identity and location of the calling incoming junction is signified to the translator TR (FIG. 1) and a tone circuit should have been taken into use for returning busy tone over the calling incoming junction in the manner to be described later. Also, the electronic scanner SC should be detecting a "junction disconnect" condition as it scans the junction concerned, in which case the bistable circuit BS19 will be restored to its normal condition (i.e. A section transistor conducting) so that there will be earth potential on lead *x* and negative potential on lead *y*. Thus, at the end of the S pulse when the output from the gate GA21 becomes positive, the bistable circuit BS17 turns over so that its B section transistor is conducting.

Since the output from the B section of the bistable circuit BS17 is at earth potential, the bistable circuit BS18 can turn over in response to a pulse (i.e. K pulse) applied to the pulse input of the gate associated with the A section when the gate GA22 opens. The negative K pulse will be inverted by an inverter NV10 and then applied to a reset lead *m* which is connected to the pulse input of the busy/free bistable circuit BS14. The bistable circuit BS14 would consequently turn over and the negative output from the B section of the transistor, after inversion by the inverter NV7, used to re-set the bistable circuits BS1 to BS12. An "AND" gate GA24 having its inputs connected, respectively, to the output from the inverter NV10 and the B section of the bistable circuit BS18 would remain closed.

If, however, busy tone is not returned to the calling incoming junction, then the "junction disconnect" signal will not be detected by the electronic scanner SC. Consequently, the lead *x* will remain at negative potential and the bistable circuit BS17 will not turn over when the first "S" pulse terminates at the end of the initial 200 millisecond period. Alternatively, if the disconnection detected by the electronic scanner SC at the end of the S pulse is due to dial impulses (i.e. break impulses) being received over the calling incoming junction rather than signifying the application of busy tone to the calling junction, then the loop condition will re-appear on the calling incoming junction and will be detected by the electronic scanner SC before the K pulse is generated in response to the opening of the "AND" gate GA22. When the loop condition re-appears the bistable circuit BS19 turns over so that an earth pulse is applied to the lead *y* thereby causing the bistable circuit BS17 to be re-set. In both of these cases, therefore, the bias input applied to the pulse-plus-bias gate associated with the A section of the bistable circuit BS18 is negative when the K pulse commences consequent upon both of the bistable circuits BS15 and BS16 having their B section transistors conducting (i.e. when the third negative pulse is produced by the multivibrator MVX). The bistable circuit BS18 does not, therefore, turn over when the K pulse is gated out from gate GA22, with the result that the output from the B section of bistable circuit BS18 remains negative. This negative potential, together wtih the K pulse inverted by the inverter NV10, is applied to the inputs of the "AND" gate GA24 which accordingly opens and the resulting output is applied to an alarm circuit for providing an alarm to indicate that the call has failed and that no busy tone has been returned to the calling incoming junction. The negative output from the inverter NV10, after inversion by an inverter NV11, is applied to the busy/free bistable circuit BS14 to effect re-setting of the dummy register. As a consequence, earth potential is applied to the lead *b* so as to arrest the multivibrator MVX while negative potential is applied to the emitters of the transistors of the B sections of the bistable circuits BS15 to BS18 to cause these bistable circuits to be restored to their normal states (i.e. A section transistors conducting).

Reverting now to the time when the dummy register DREG passed the identity of the calling incoming junction stored within it to the translator TR (FIG. 1). The translator TR also has identified to it the unit of the exchange in which the calling incoming junction is located and the translator recognises that the information is being passed to it from a dummy register, as distinct from a normal register, such as the register REG (FIG. 1), and consequently that busy tone (i.e. equipment engaged tone) is required to be transmitted to the calling incoming junction in question. A tone circuit capable of returning busy tone to the calling incoming junction is accordingly taken into use in the manner now to be described with reference to FIG. 3 of the drawings.

This tone circuit will be connected through to the line circuit on which terminates the calling incoming junction connected over switching means which are operated in accordance with the information passed to the translator TR, FIG. 1). The tone circuit has $+ve$ and $-ve$ wires which are connected up to the $+ve$ and $-ve$ line wires of the calling incoming junction and, in addition, it has P, H and C wires for the purposes which will hereinafter be referred to.

Considering now the operation of the circuit for the return of busy tone to a calling incoming junction to which the tone circuit has been coupled, the tone circuit is seized by a positive pulse applied to the C-wire extending from the switching means (not shown). This positive pulse applied to the C-wire brings about the operation of seize relay S which, in operating, effects closure of contacts *s1* to extend negative potential on the $+ve$ wire to relay ET for the operation of the latter. Relay ET operates and prepares a holding circuit for itself over contacts *et1*. Contacts *et2* extend busy tone (i.e. equipment engaged tone) to the centre winding of relay L. A relay CB operates due to the earth potential applied over operated contacts *s2* and earth potential is applied to the H-wire over made contacts *cb4*. The relay CB operates at substantially the same time as the relay ET, with the result that contacts *cb2* may momentarily apply negative potential to a relay PK for the completion of an energising circuit for the latter relay, which accordingly operates, before the relay is released by being short-circuited when relay ET operates and contacts *et4* close.

Relay E operates over contasts *s4* and locks up independently of relay S over its own contacts *e3* so that it is then dependent for its release upon the operation of a relay TC to be referred to later. Contacts *e1* and *e2* extend pulse supplies connected to leads *p1* and *p2* to a timing arrangement comprising three bistable circuits BS20, BS21 and BS22, several gates and inverters. The bistable circuits BS20 to BS22 are set by the application of earth potential to transistor emitters over operates contacts *cb3* so that the transistors of the A sections of the bistable circuits BS20 and BS22, and the transistor of the B section of the bistable circuit BS21, are rendered conducting.

The transistor bistable circuits BS20 to BS22 define a binary counter having a count of eight and arranged to be driven by pulses received alternately over the pulse leads *p1* and *p2*.

The tone circuit positive seize pulse is next removed from the C-wire, with the result that relay S is caused to release. Contacts *s3* open, thereby removing the short-circuit from a relay SA which accordingly operates over a path including the operated contacts *et3*. As relay SA operates, it applies over contacts *sa4* earth potential to the emitters of the transistors of the B sections of the transistor bistable circuits BS20 and BS22 and to the emitter of the A section transistor of the bistable circuit BS21. At the same time, contacts *sa3* apply earth potential to the P-wire for operating a relay in the junction circuit and earth potential is applied to the C-wire over closed contacts *sa2* to cause a calling marker to set the cross points of cross-point switches, for example, in readiness for returning busy tone to the calling incoming junction.

The counter comprising the three bistable circuits BS20 to BS22 is arranged to respond to pulses applied alternately to the pulse leads *p1* and *p2* connected to suitable pulse supplies. It may here be mentioned that two pulse supplies are provided for security reasons so that if one pulse supply should fail to provide negative pulses on the lead *p1* or *p2*, then the other pulse supply will drive the counter at half speed. For the purposes of description, however, the pulses applied alternately to the leads *p1* and *p2* may conveniently be considered as pulses applied every 100 milliseconds to a single pulse lead extending through an inverter to the bistable circuit BS20 so as to cause the bistable circuit BS20 to turn over in response to each pulse. Also for the sake of convenience, the conditions of the bistable circuits BS20 to BS22 will be signified by a "0" if their A section transistors are conducting and by a "1" if their B section transistors are conducting.

The conditions of the bistable circuits BS20 to BS22 consequent upon the receipt of pulses on the leads *p1* and *p2* following the operation of relay SA is shown in the following table.

| | BS20 | BS21 | BS22 |
|---|---|---|---|
| Immediately prior to operation of relay SA | 0 | 1 | 0 |
| Upon receipt of 1st pulse | 1 | 1 | 0 |
| Upon receipt of 2nd pulse | 0 | 0 | 1 |

When the bistable circuit BS22 turns over to its "1" condition upon receipt of the 2nd pulse on leads *p1*, *p2* (i.e. between 100 and 200 milliseconds after operation of relay SA), the positive output from the B section is inverted by an inverter NV12 and opens a gate GT26 which is primed by the positive potential applied to its emitter connection over contacts *sa1*. The positive output from the opened gate GT26 operates relay GA. It will be recalled that relay ET operated in response to the relay S and locked up over its own contacts *et1* and the contacts *cb*2. Thus, the contacts *ga*2, in closing, complete an operating circuit for relay HA over the already closed contacts *et*3. Relay HA, in operating, extends busy tone (i.e. equipment engaged tone) derived from the tone generator (not shown) connected to the centre winding of the relay L over made contacts *et*2 to the incoming junction over closed contacts *ha*1 and *ha*2. The extension of the calling loop over contacts *ha*1 and *ha*2 completes an operating circuit for relay L. At the same time, contacts *ha*4 serve to connect a ½ min. pulse supply to a pulse lead *p*3 at this point in the operation.

If it is assumed that the calling subscriber upon receiving busy tone back over the line replaces his handset so as to remove the loop from the calling incoming junction, then the relay L will be released due to a disconnection of the loop. Make-before-break contacts *l*2, as they restore, momentarily apply earth potential from over contacts *ha*3 to the transistor bistable circuit BS22 so that the latter turns over to its "0" condition as a consequence of which the bistable circuits BS20, BS21 and BS22 are re-set to the 0–0–0 condition. When make-before-brake contacts *l*1 restore, earth potential is applied via the opened gate GT27 having its emitter earthed over closed contacts *sa*1 and causes relay RL to operate.

When relay RL operates, the counter is still in its reset state (i.e. 0–0–0) and the next four pulses received on the leads *p*1, *p*2 cause the counter to step as shown in the table below.

| Pulses on leads *p*1, *p*2 | BS20 | BS21 | BS22 |
|---|---|---|---|
| 1st pulse | 1 | 0 | 0 |
| 2nd pulse | 0 | 1 | 0 |
| 3rd pulse | 1 | 1 | 0 |
| 4th pulse | 0 | 0 | 1 |

Consequent upon the bistable circuit BS22 turning over to its "1" state, the positive output from the opened gate GT26 operates a relay TB over contacts *ga*3 and *rl*3. Relay TC operates to the positive output from an opened gate GT28 over closed contacts *rl*2 and *tb*3. As relay TC operates, the operating circuit for relay E is interrupted at contacts *tc*2. The relay ET has its operating coil short-circuited by the earth potential applied over made contacts *tc*4 and accordingly releases. At contacts *et*3 the operating circuit for relay HA is disconnected to remove the relay L from the incoming junction circuit at contacts *ha*1 and *ha*2, while the tone generator is disconnected from relay L by the opening of contacts *et*2. The contacts *et*3 also interrupt the operating circuit of relay SA which accordingly releases. Relay SA, in releasing, removes the earth potentials from the P-wire and the C-wire. The earth potential applied to the P-wire when relay SA operated may be utilised to hold operated a relay in the incoming junction circuit which removes the calling potential from the calling lead *cl* extending to the gating circuit GC (FIG. 1).

After the operation of relay TB and before the release of relay E to disconnect the pulse supplies from the pulse leads *p*1 and *p*2 at the contacts *e*1 and *e*2, the counter BS20 to BS22 receives four further pulses and steps in the manner shown in the table below.

| | BS20 | BS21 | BS22 |
|---|---|---|---|
| 5th pulse | 1 | 0 | 1 |
| 6th pulse | 0 | 1 | 1 |
| 7th pulse | 1 | 1 | 1 |
| 8th pulse | 0 | 0 | 0 |

It will be observed that upon the bistable circuit BS22 turning over to its "0" state upon receipt of the 8th pulse on leads *p*1, *p*2, the gates GT26 and GT28 are closed, with the result that relays GA, TB and TC are released. When relay TC releases, the priming earth emitter potential for a gate GT29, whose positive output holds the relay CB operated, is removed at contacts *tc*3. As a consequence, the relay CB releases and earth potential is removed from the H-wire at contacts *cb*4. When relay GA releases, the operating circuit for relay RL is interrupted at contacts *ga*4 and the relay releases.

The tone circuit has now been restored to its normal condition in readiness for dealing with another calling incoming junction which fails to find a free normal register, such as the register REG.

The operation of the tone circuit from the point where the relay L released is based on the assumption that the loop was removed from the incoming junction consequent upon busy tone being returned to the calling subscriber.

If, however, the calling subscriber does not replace his handset, then provision is made for restoring the tone circuit to normal after a time delay.

At the time when the ½ min. pulse lead is connected to lead *p*3, the relays E, CB, ET, SA, GA, L and HA are operated.

When the first ½ min. pulse is received on the lead *p*3, a relay TA operates to the positive output derived from opened gate GT30 having its emitter connection taken to earth over contacts *sa*1. The relay TB is prevented from operating for the duration of the ½ min. pulse even though the bistable circuit BS22 turns over to its "1" condition by the positive output applied to the input of the gate GT26 from an inverter NV13.

After the end of the first ½ min. pulse, the relay TB will operate when the counter is set to any of the conditions shown in the table below.

| BS20 | BS21 | BS22 |
|---|---|---|
| 0 | 0 | 1 |
| 1 | 0 | 1 |
| 0 | 1 | 1 |
| 1 | 1 | 1 |

When the second ½ min. pulse is received on the lead *p*3, the output from the gate GT30 operates relay RS over contacts *tb*2.

Relay RL is arranged to be operated by the output from gate GT27 when the bistable circuits BS21 and BS22 are in their "0" conditions, since gate GT31 is only open when such conditions obtain. The conditions of the bistable circuits BS20 to BS22 can thus be 1–0–0 or 0–0–0.

Thereafter, the operation of the circuit is similar to that already described for the case where the calling subscriber replaced his handset upon receiving busy tone, that is to say after the operation of relay RL and the release of relay L and the consequent re-setting of the bistable circuits to their 0–0–0 conditions. Relay TA and relay L, however, will be released in response to the release of relay HA: relay TB will be released by the release of relay RL, and relay RS will be released consequent upon the release of relay TB.

Once again the tone circuit is released in readiness for dealing with another call which fails to find a free normal register.

The tone circuit also provides for the return of N.U. tone over a calling incoming junction, and for this purpose the negative potential applied to the $+ve$ wire to operate relay ET when busy tone is required is replaced by positive potential for operating a relay NT. Otherwise the circuit operation is the same as for applying busy tone.

A still further facility afforded by the tone circuit is that of holding or "parking" a calling incoming junction. This "parking" facility is provided because the dummy registers, such as the register DREG, have a short holding time compared with the holding time of the tone circuits which depends on the time the calling subscriber holds on after receiving busy tone or N.U. tone back from the exchange. Without the "parking" facility, a large number of tone circuits would need to be provided to ensure that under congestion conditions the dummy registers are left without a free tone circuit. This would mean that a dummy register would be unable to set up a path back to the calling incoming junction circuit, as a consequence of which the calling junction will be signifying a continuous calling condition to the registers. In order to avoid this eventuality when employing a limited number of tone circuits, it is arranged that the last free tone circuit to be taken into use is controlled from the translator to merely "park" the junction without sending any tones, with the consequent shortening of the holding time of the tone circuit. In other words, the tone circuits only return busy tone when there is sufficient time available.

In the case of "parking," neither negative nor positive potential is applied to the +*ve* wire. Relay S operates, however, to a tone circuit "seize" potential on the C-wire. Relay S, in operating, causes relays CB, E and PK to be operated. When the "seize" signal is removed from the C-wire, relay S releases and permits the operation of relay SA by the removal of the short-circuit over contacts *s*3.

Relay GA is operated as in the operation of the circuit for applying busy tone, but the relay HA cannot operate since earth potential is held off by the non-operation of relay ET or NT. As a consequence, relay L remains unoperated and the release sequence of operations for the tone circuit commences as soon as the counter BS20, BS21 and BS22 assumes the 0–0–0 state.

Parking of the calling incoming junction circuit is achieved by the application of earth potential to the P-wire over operated contacts *sa*3 to operate a relay in the incoming junction circuit for 400 milliseconds. Upon the removal of the earth potential from the P-wire, the junction circuit is parked.

In the specific example of tone circuit just above described, the relay in the calling incoming junction circuit held operated by the earth applied to the P-wire consequent upon the operation of relay SA, serves for disconnecting the calling potential from the calling lead *cl* (FIG. 1).

In an alternative arrangement, however, a tone circuit is arranged to release after being connected up to the calling incoming junction circuit. It leaves a relay operated in this junction circuit and this relay disconnects the calling potential from the calling lead *cl* (FIG. 1) to allow a dummy register to release without an "alarm" indication being given. At the same time, this relay in the junction circuit connects busy tone to the calling incoming junction for as long as the calling condition persists.

What we claim is:

1. An automatic telephone exchange system comprising an exchange; incoming junction lines connected to said exchange; normal registers at said exchange for registering called lines' identities in response to the receipt of dial impulses over said calling incoming lines; an additional register constituting a dummy register comprising means for rendering said dummy register effective only when all of said normal registers are engaged and means for storing within itself the identity of a calling incoming junction for which the dummy register is taken into use; a busy tone circuit; and means for coupling up said busy tone circuit to the calling junction identified within the dummy register for returning busy tone to the calling incoming junction.

2. An automatic telephone exchange system as claimed in claim 1, including a timing arrangement in said dummy register arranged to be started into operation when the dummy register is initially seized and which causes the dummy register to be released after a predetermined time period.

3. An automatic telephone exchange system as claimed in claim 1, including an alarm circuit in said dummy register for giving an alarm if busy tone has not been returned to the calling incoming junction after an appropriate time delay.

4. An automatic telephone exchange system as claimed in claim 1, in which the tone circuit coupled up to a calling incoming junction through switching means set in accordance with the identity of the calling incoming junction is arranged to be released, if necessary, after the expiration of a predetermined time delay.

5. An automatic telephone exchange system as claimed in claim 1, comprising electronic scanning means which scans each of the junctions in turn for the calling condition and which extends the identities of calling incoming junctions to the normal and dummy registers.

6. An automatic telephone exchange system as claimed in claim 5, in which the tone circuit which is coupled up to the calling incoming junction circuit for returning busy tone to a calling subscriber brings about the operation of relay means in the calling junction circuit which removes the calling condition from the incoming junction circuit so that the electronic scanning means will find the incoming junction in question in the disconnected or free condition and signify such condition to the dummy register.

7. An automatic telephone exchange system as claimed in claim 5, comprising means for signifying the busy/free conditions of the normal registers to the dummy register which has means for identifying itself to an allotter as being free so long as all of the normal registers are signifying to the dummy register that they are in the engaged condition.

8. An automatic telephone exchange system as claimed in claim 7, in which the busy/free conditions of the normal registers are signified to the dummy register by an electronic gating arrangement forming part of the dummy register.

No references cited.

KATHLEEN H. CLAFFY, *Primary Examiner.*

WILLIAM C. COOPER, *Assistant Examiner.*